Patented Nov. 24, 1931

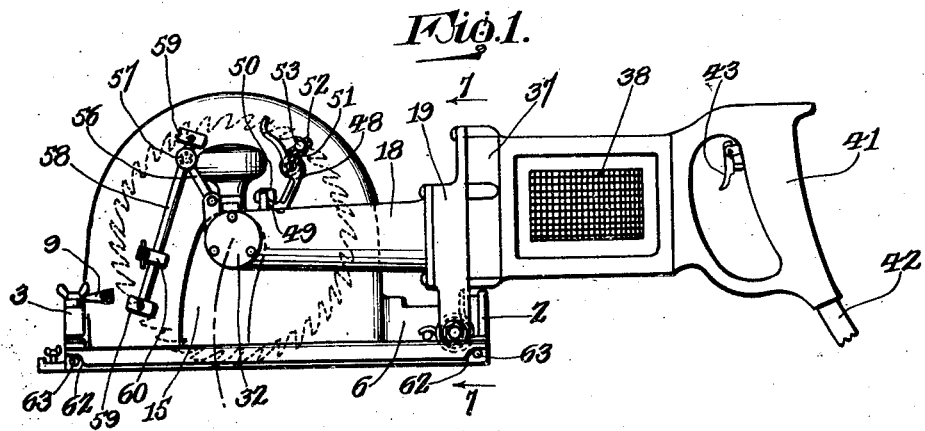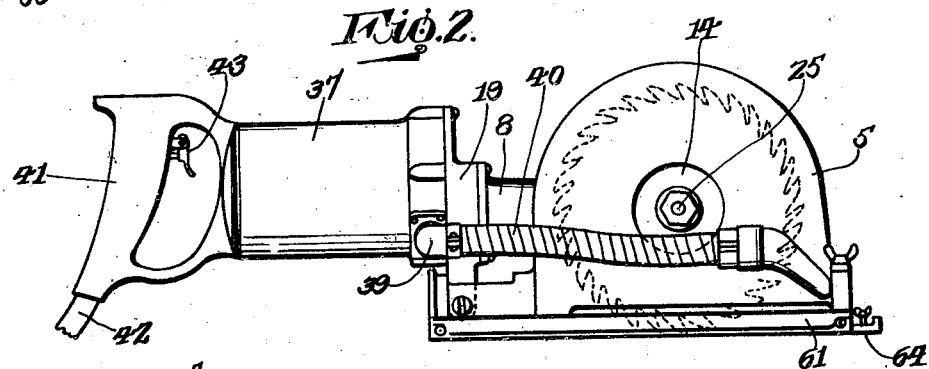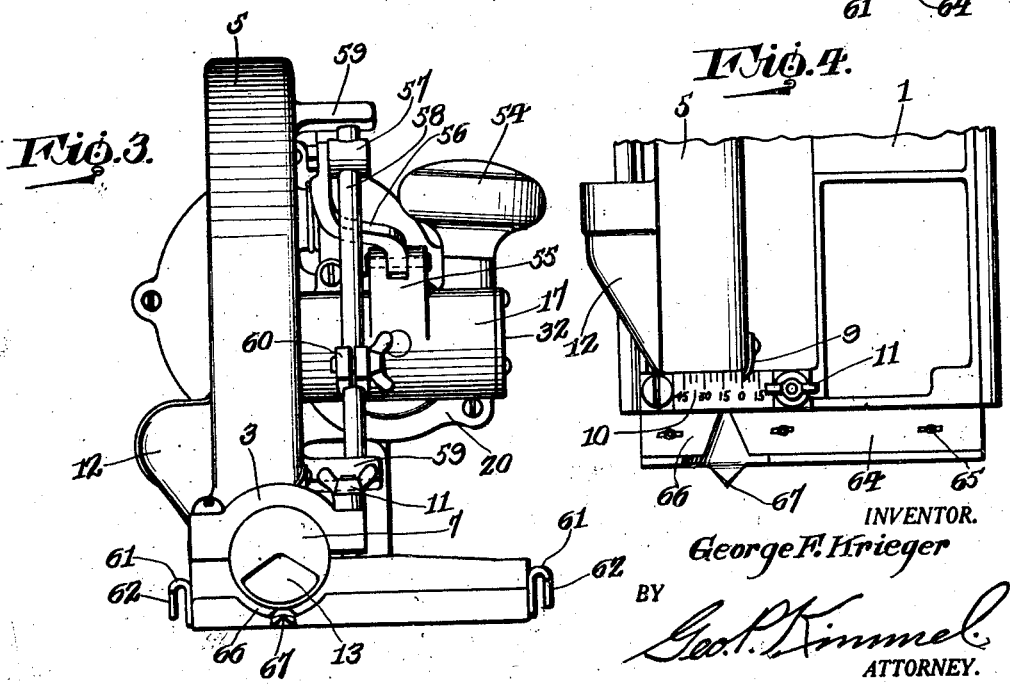

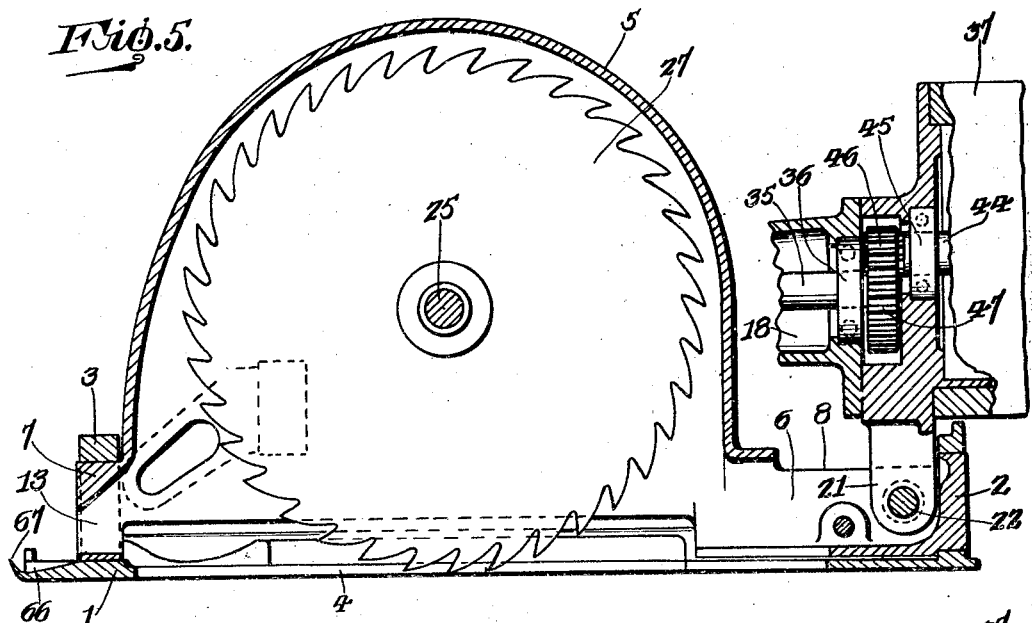
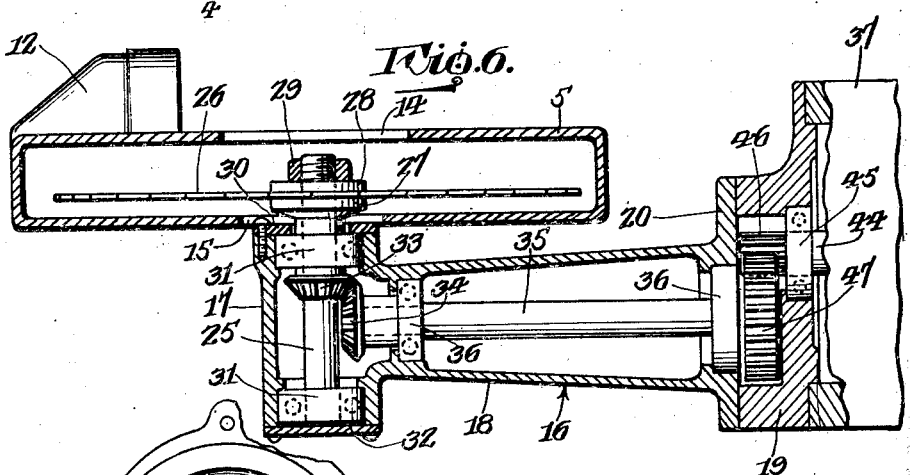
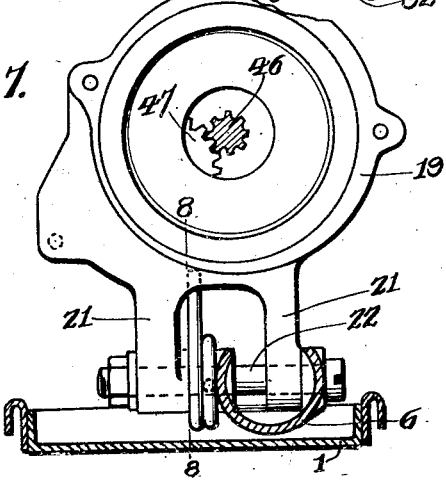
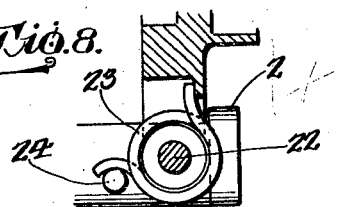

1,833,785

UNITED STATES PATENT OFFICE

GEORGE F. KRIEGER, OF WISCONSIN RAPIDS, WISCONSIN

PORTABLE POWER SAW

Application filed January 15, 1931. Serial No. 508,974.

This invention relates to a portable power saw and has for its primary object to provide, in a manner as hereinafter set forth, a saw of such class which may be readily adjusted to cut at various angles and depths, which is sturdy and simple in construction, and which may be used in connection with a protractor or width gauge if desired.

A further object of the invention is to provide a saw of the character aforesaid which includes means for removing sawdust from the line of cut in order to maintain such line of cut clearly visible.

A further object of the invention is to provide a saw of the character aforesaid including a rotatable saw element and operating means therefor which are pivotally mounted on a supporting base in a manner to provide automatically for the latching of the saw element normally in inoperative position, and further including an adjustable stop for limiting the depth of cut when the saw element is released from its inoperative position.

A further object of the invention is to provide a power saw including a rotatable saw element and operative means therefor as aforesaid, in which the saw element is driven by an electric motor, and wherein the saw element and motor are movable about a common pivot and are arranged in counter-balancing relation with respect to each other.

With the foregoing and other objects in view, the invention consists of the novel construction, combination and arrangement of parts as hereinafter more particularly described and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings wherein like numerals are employed to designate like parts throughout the several views:

Figure 1 is a side elevation of a saw in accordance with this invention.

Figure 2 is a similar view as seen from the opposite direction.

Figure 3 is an enlarged front elevation of the saw.

Figure 4 is an enlarged fragmentary top plan thereof.

Figure 5 is an enlarged fragmentary vertical section through the saw.

Figure 6 is an enlarged fragmentary horizontal section therethrough.

Figure 7 is an enlarged sectional elevation taken substantially at a point indicated by the line 7—7 of Figure 1.

Figure 8 is a fragmentary section taken on the line 8—8 of Figure 7.

Referring to the drawings in detail, the numeral 1 indicates a base formed at its rearward end with a bearing 2 of continuous construction, and formed adjacent its forward end with a split bearing 3. Between the bearings 2 and 3, the base 1 is formed with a recess 4. Disposed over the recess 4 is a guard 5 which is of hollow construction open at its bottom and which is provided with integrally formed hollow projections 6 and 7 at the rear and front thereof respectively. The hollow projection 6 is recessed in its upper face as indicated at 8. Projecting forwardly from the guard 5, just above the split bearing 3, is a pointer 9 for coaction with the calibrated upper face 10 of the bearing 3 for the purpose of accurately adjusting the angle of the guard transversely of the base. The split bearing 3 is provided with a suitable wing nut 11 by means of which the projection 7 may be secured within the bearing 3 with the guard 5 at the desired inclination. Adjacent the forward face thereof, the guard 5 is formed with a hollow boss 12 which opens through a side wall of the guard, and which is in registry with a substantially triangular opening 13 with which the projection 7 is formed. The guard 5 is provided in one side wall with a circular opening 14, and in its opposite side wall with an elongated recess 15 extending upwardly from the open bottom of the guard.

Disposed at one side of the guard is a shaft and gear housing indicated generally at 16 and including a forward part 17, an intermediate part 18, and a rear part 19. The parts 17 and 18 are of tubular construction, formed integrally, and extending at right angles to each other. The rear part 19 is suitably secured to a flange 20 at the rearward end of the intermediate part 18, and is formed with a pair of depending legs 21 which are secured to the rearward projection 6 of the guard by means of a pivot pin 22. One of the legs 21 extends within the projection 6, while the other leg 21 extends along one side of the projection. Coiled around the pivot pin 22 is a coiled spring 23, one end of which bears against the forward face of the housing part 19, and the other end of which bears against a stop pin 24 projecting from the projection 6. The action of the spring 23 normally tends to swing the shaft and gear housing 16 in an upward arc about the pivot pin 22.

The forward part 17 of the shaft and gear housing 16 projects laterally from the guard 5 in registry with the recess 15 therein. Journaled within the forward part 17 is a shaft 25 having a saw element 26 mounted thereon and disposed within the guard 5. As shown the shaft 25 is formed with a shoulder 27 against which the saw element 26 is secured by means of a washer 28 and nut 29. The shaft 25 extends through a removable cover 30 at the inner end of the forward part 17 and is mounted in a pair of bearings 31 disposed within the part 17. At the outer end thereof, the part 17 is provided with a removable closure member 32. Fixedly mounted on the shaft 25 is a beveled gear 33 which is in mesh with a similar beveled gear 34 fixedly mounted on a shaft 35 extending through the intermediate part 18 of the shaft and gear housing 16. The shaft 35 is mounted in a pair of bearings 36 disposed within the part 18.

Suitably secured to the rear part 19 of the shaft and gear housing 16 is a motor and fan housing 37 which is provided at one side thereof with a screened air inlet 38, and which is further provided at the opposite side thereof with an exhaust 39. Leading from the exhaust 39 to the hollow boss 12 formed on the guard 5 is a flexible air conduit 40. At the rearward end thereof the motor housing 37 is provided with a grip member 41 having an extension cord 42 extending therefrom and adapted for connection with a source of electrical supply, not shown. The grip 41 is provided with a suitable switch 43 for controlling the supply of energy to the motor in the housing 37. The shaft 44 of the motor is journaled in a bearing 45 disposed within the rear part 19 of the shaft and gear housing 16, and is provided at its forward end with a pinion 46 which meshes with a gear 47 fixedly mounted on the rearward end of the shaft 35.

Pivotally mounted on a side wall of the guard 5 is an angular latch member 48 which is formed at its lower end with a nose 49 for engagement with a lug 50 secured to and projecting above the intermediate part 18 of the shaft and gear housing 16. The nose 49 is normally forced in a forward direction by means of a spring 51 encircling the pivot for the member 48, such movement being limited by an adjustable set screw 52 threaded through a lug 53 projecting from the guard 5. The inner end of the set screw 52 abuts against the rearward face of the member 48 above the pivot therefor and provides a stop for limiting the forward movement of the nose 49. The forward part 17 of the housing 16 is provided with a grip member 54 which is located in proximity to the latch member 48 in order that the latch member may be released by pressing the upper end thereof with the thumb when the hand is in position on the grip member 54.

Projecting upwardly from the forward part 17 of the housing 16 is a lug 55 to which is pivotally connected one end of a link 56, the opposite end of which is pivotally connected with a slide 57 mounted on a guide rod 58 secured to and extending in a straight line between a pair of lugs 59 projecting from the guard 5. Adjustably mounted on the guide rod 58 is a stop 60 which may be set at any point desired along the guide rod in order to limit the movement of the slide 57 in accordance with the depth of cut which it is desired to make with the saw element 27. The guide rod 58 may be calibrated if desired in order that the stop 60 may be accurately positioned thereon.

Secured to the sides of the base 1 and extending longitudinally thereof are a pair of elongated members 61 which are of substantially inverted U-shape in cross section. The forward and rearward lower corners of the outer folds of the members 61 are recessed as indicated at 62 in order that holdfast devices such as 63 may be passed therethrough and through the inner folds of the members 61 to secure the latter to the base. The purpose of the members 61 is to enable the saw to be used with a protractor if desired. A portion 64 of the base 1 projects forwardly of the projection 7 on the guard 5 and is provided with a plurality of bolts 65 in order that a width gauge may be secured thereto if desired. In alignment with the opening 13 through the projection 7, the forward portion 64 of the base is formed with a trough 66, and projecting forwardly from the trough 66 is a pointer 67 which is adapted to be centered with respect to the line of cut to be made with the saw element 27. The trough 66 is tapered with the sides thereof diverging from the line of cut in a forward direction.

In the use of the saw, the guard 5 is adjusted at the desired angle with respect to the base, and the stop 60 is positioned on the guide rod 58 in accordance with the depth of cut which it is desired to make. The saw is then grasped by the grip members 41 and 54 and the switch 43 thrown by one hand of the operator, and the latch member 48 released by the other hand of the operator. Upon the release of the latch member 48, the shaft and gear housing 16 is swung in a downward arc by the pressure of the operator's hand on the grip member 54 until the slide 57 is brought into contact with the stop 60. Upon the release of the grip member 54, the housing 16 is swung about its pivot in an upward arc by the action of the spring 23, whereby the lug 50 rides over the inclined lower face of the nose 49 on the latch member 48, which causes the nose 49 to be moved rearwardly until cleared by the lug 50, after which the spring 51 operates to move the nose into latching position beneath the lug 50. When the housing 16 is latched in its upward position, the saw element 27 is withdrawn from its projecting position through the slot 4, whereby no damage may be done by the saw element should the motor be started by the inadvertent pulling of the switch 43. Owing to the counter-balancing relation of the motor and fan housing and the portions 17 and 18 of the shaft and gear housing, it is necessary for the spring 23 to exert only a comparatively small force in order to swing the forward end of the housing 16 into position to be latched by the member 48. During the sawing operation, the pointer 67 is moved along the line of cut, such line being kept clear of sawdust and the like continually by the discharge of air from the opening 13 and along the trough 66. The air is cleaned by the screen 38 as the same enters the housing and is transmitted from the exhaust 39 through the conduit 40 to the hollow boss 12 which is in communication with the opening 13.

It is thought that the many advantages of a power saw in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. In a portable power saw, a rotatable saw element, means for driving and supporting the saw element, a pivotally mounted housing for said means, a guard for the saw element, said guard having a slotted wall for the passage of said housing, said means, saw element and housing being movable in unison about the pivot for the housing to provide for sliding movement of the saw element relative to the guard, a latch lug projecting upwardly from the housing, a latch finger pivoted intermediate its ends to the guard, tension means acting on the latch finger to swing an end portion thereof into position for engagement with the latch lug when the saw element is raised, and a set screw engaging the opposite end portion of the latch finger to limit the swinging movement of the latter by the tension means.

2. In a portable power saw, a rotatable saw element, means for driving and supporting the saw element, a pivotally mounted housing for said means, a guard for the saw element, said guard having a slotted wall for the passage of said housing, said means, saw element and housing being movable in unison about the pivot for the housing to provide for sliding movement of the saw element relative to the guard, a guide rod secured to the guard and extending in a straight line, a slide mounted on and movable lengthwise of the guide rod, a lug on the housing, a link having its ends pivotally connected to said lug and slide, and an adjustable stop on the guide rod for abutment with the slide to limit pivotal movement of the housing.

3. In a portable power saw, a base, a guard mounted thereon, and a rotatable saw element within the guard, said base projecting forwardly of the guard and formed with a trough having its sides diverging from the line of cut of the saw element in a forward direction, said guard being formed with an air conduit opening into the rearward end of the trough.

In testimony whereof, I affix my signature hereto.

GEORGE F. KRIEGER.